United States Patent [19]
Valaitis et al.

[11] Patent Number: 5,486,249
[45] Date of Patent: Jan. 23, 1996

[54] THERMOPLASTIC FILMS FOR HEAT SEAMING ROOF SHEETING AND METHOD FOR COVERING ROOFS

[75] Inventors: Joseph K. Valaitis, Brecksville; James A. Davis, Uniontown; Frederick Lohr, Akron, all of Ohio

[73] Assignee: Bridgestone Corporation, Tokyo, Japan

[21] Appl. No.: 349,139

[22] Filed: Dec. 5, 1994

Related U.S. Application Data

[60] Continuation of Ser. No. 133,522, Oct. 8, 1993, abandoned, which is a division of Ser. No. 741,915, Aug. 8, 1991, Pat. No. 5,260,111.

[51] Int. Cl.$^6$ .............................. B32B 31/26; C09J 5/10
[52] U.S. Cl. .................. 156/71; 156/157; 156/306.6; 156/308.4
[58] Field of Search .................. 156/71, 157, 306.6, 156/308.4, 309.6; 428/57, 58, 141, 147, 255, 295, 517, 519, 521, 520; 525/97

[56] References Cited

U.S. PATENT DOCUMENTS

| | | |
|---|---|---|
| 3,280,082 | 10/1966 | Natta et al. . |
| 3,650,874 | 3/1972 | Job .............................. 156/307.7 |
| 3,660,224 | 5/1972 | Cau .............................. 156/306.6 |
| 3,793,130 | 2/1974 | Marzocchi ........................ 428/295 |
| 3,801,531 | 4/1974 | Berejka et al. . |
| 3,867,247 | 2/1975 | O'Farrell et al. . |
| 3,880,693 | 4/1975 | Urlings et al. . |
| 4,130,535 | 12/1978 | Coran et al. . |
| 4,212,787 | 7/1980 | Matsuda et al. . |
| 4,355,139 | 10/1982 | Coran et al. . |
| 4,480,012 | 10/1984 | Fieldhouse ........................ 428/506 |
| 4,601,935 | 7/1986 | Metcalf et al. . |
| 4,640,730 | 2/1987 | Streets ............................ 156/157 |
| 4,732,925 | 3/1988 | Davis . |
| 4,767,653 | 8/1988 | Renstrom ......................... 428/57 |
| 4,767,658 | 8/1988 | Lorenz ............................ 428/192 |
| 4,778,852 | 10/1988 | Futamura ......................... 525/97 |
| 4,803,020 | 2/1989 | Valaitis et al. . |
| 4,855,362 | 8/1989 | Muse, Jr. et al. . |
| 4,910,059 | 3/1990 | Sancaktar ........................ 428/47 |
| 4,985,502 | 1/1991 | Izumi ............................. 525/194 |
| 5,162,436 | 11/1992 | Davis ............................. 525/97 |
| 5,242,970 | 9/1993 | Davis ............................. 428/149 |
| 5,256,228 | 10/1993 | Davis ............................. 156/157 |

FOREIGN PATENT DOCUMENTS

| | | |
|---|---|---|
| 0386419A1 | 9/1990 | European Pat. Off. . |
| 1366058 | 9/1974 | United Kingdom . |

OTHER PUBLICATIONS

"Rubber-Thermoplastic Compositions. Part V. Selecting Polymers for Thermoplastic Vulcanizates" by Coran et al., Rubber Chemistry and Technology vol. 55.
J. Shields, *Adhesives Handbook*, pp. 29, 259-260, and 344. The Chemical Rubber Co., Cleveland, Ohio 1970.

*Primary Examiner*—Michael W. Ball
*Assistant Examiner*—Daniel J. Stemmer
*Attorney, Agent, or Firm*—Frank J. Troy, Sr.

[57] ABSTRACT

A laminate seam of flat rubber sheet material for roofing comprising two layers (10, 11) of the sheet material, at least one layer of which is uncured or cured, and one layer of a thermoplastic film (14) interposed between the overlapped edges (12,13) of the two layers of sheeting material to form a seam without the use of an adhesive. A method for covering a roof comprises the steps of applying a thermoplastic film (14) to the edge (12) of at least one layer of a flat rubber sheet material (10); applying a second layer of flat rubber sheet material (11) overlapping the thermoplastic film and the edge of the first flat rubber sheet material; heating the overlapped area to a temperature slightly above the peak melt temperature of the thermoplastic film; and, seaming the overlapped area under sufficient heat and pressure to provide an acceptable seam without the use of an adhesive.

9 Claims, 1 Drawing Sheet

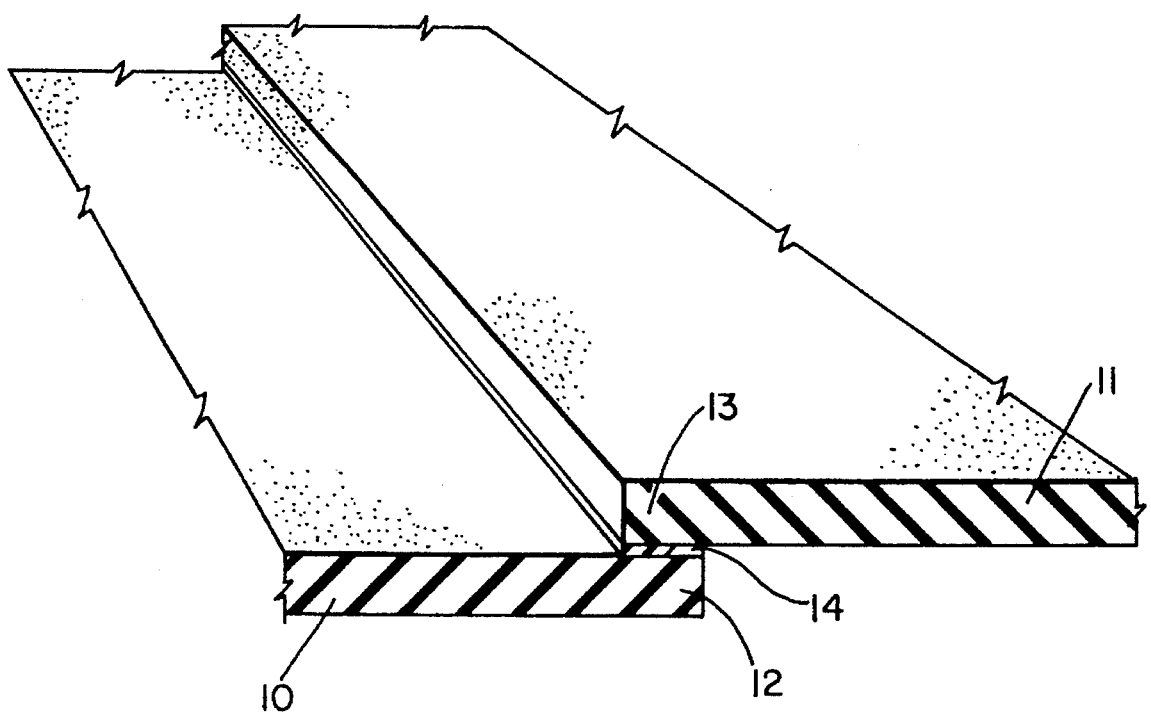

THERMOPLASTIC FILMS FOR HEAT SEAMING ROOF SHEETING AND METHOD FOR COVERING ROOFS

This application is a file wrapper continuation of U.S. patent application Ser. No. 08/133,522, filed Oct. 8, 1993, now abandoned, which is a division of application Ser. No. 07/741, 915, filed Aug. 8, 1991, now Pat. No. 5,260,111.

TECHNICAL FIELD

The present invention relates generally to sheeting material used for roofing. More particularly a thin thermoplastic film is provided for seaming together two reinforced or unreinforced rubber sheets comprising ethylene-propylene-diene (EPDM) terpolymers, ethylene-propylene copolymers, or other similar olefin-type polymers, and mixtures thereof, as well as sheeting manufactured from butyl, neoprene, or other polymers, including polyvinyl chloride (PVC), chlorinated polyethylene (CPE), chlorosulfonated polyethylene and the like. The rubber sheets may be sulfur cured or uncured, and scrim reinforced or not. A method is also provided for coveting roofs which includes the step of employing the thin thermoplastic film of the present invention.

BACKGROUND OF THE INVENTION

Polymeric roof sheeting is used as single ply roofing membrane for covering industrial and commercial flat roofs. Such membranes are generally applied to the roof surface in vulcanized or cured state.

Because of outstanding weathering resistance and flexibility, cured EPDM based roof sheeting has rapidly gained acceptance. This material normally is prepared by vulcanizing the composition in tile presence of sulfur or sulfur containing compounds such as mercaptans. Our earlier U.S. Pat. No. 4,803,020 also teaches the use of radiation crosslinking promoters in an EPDM sheeting composition which can be cured by ionizing radiation.

Notwithstanding the usefulness of radiation curing and sulfur curing, a disadvantage of utilizing these elastomers is the lack of adhesion of EPDM, especially cured EPDM, to itself. Besides being highly labor intensive, this is a serious problem also because, in applying EPDM sheets to a roof, it is usually necessary to splice the cured EPDM sheets together. This splice or seam area is subjected to both short term and long term stresses such as those caused by roof movement, heavy winds, freeze-thaw cycling and thermal cycling. Such stresses may manifest themselves in shear forces or peel forces, i.e.; the seam peels back under severe stress conditions or may cause a partially open seam (often referred to as a fish-mouth condition) under less severe conditions.

In view of the foregoing problem, it has been necessary to utilize an adhesive to bond the cured EPDM sheets together. As will be evident from the above discussion, an adhesive for bonding cured EPDM elastomer roofing sheets together must meet a number of requirements which are extremely difficult to satisfy. Thus, the adhesive must provide sufficient seam peel and shear strength to permit the splice formed by bonding the cured EPDM roofing sheets together to resist both the short term and long term stresses such as those discussed hereinabove. Moreover, the adhesive must be resistant to oxidation, hydrolysis and chemical attack from pooled water. Additionally, the adhesive must provide the important property often referred to in the adhesive art as "Quick Stick". The term "Quick Stick" refers to that characteristic of the two sheets of material, which have been coated with an adhesive composition, to develop virtually immediate adhesive strength when placed in contact with each other.

Quick Stick is an extremely important property in an adhesive which is utilized to splice cured EPDM elastomer roofing sheets together. Thus, adhesive compositions presently known, generally require anywhere from about two (2) to about seven (7) days at room temperature (i.e. 22° C.) to attain maximum adhesive seam strength. At higher ambient temperature, this time period may be somewhat less but at a minimum it will generally be at least 24 hours. The conventional procedure for splicing the EPDM roofing sheets together is to make the splice within a relatively short period of time after the adhesive coating has been applied to each sheet, generally within 30 minutes but often less. Accordingly, the adhesive composition must provide sufficient immediate adhesive strength or Quick Stick to permit the splice to withstand stresses from winds, movement, handling by installers, etc. until the adhesive achieves its maximum strength which as indicated will generally take from about two (2) to seven (7) days.

Commercial contact adhesives which are conventionally employed for bonding cured EPDM elastomer roofing sheets together generally consist of solutions of neoprene or neoprene-type or butyl or butyl-type polymers in aromatic or aromatic-aliphatic solvents containing 2-butanone often along with tackifying resins. However, such adhesives have not proven to be very satisfactory due to their lower than desirable seam peel adhesion strengths. Thus, the neoprene or butyl-type adhesives often provide peel adhesion values at 22° C. of only 1 to 2 pounds per linear inch. Additionally, the use of organic solvents in such systems would likely run afoul of environmental regulations, and which control the release of volatile organics.

Pressure sensitive and contact adhesive compositions containing neutralized, partially neutralized or unneutralized sulfonate elastomers, tackifying resins and organic solvents or organic solvent mixtures are known in the prior art as shown by U.S. Pat. Nos. 3,801,531 and 3,867,247.

U.S. Pat. No. 3,801,531 relates to pressure sensitive adhesive compositions which contain thiouronium derivatives of unsaturated elastomers or neutralized, partially neutralized or unneutralized sulfonated elastomers including sulfonated EPDM, tackifying resins including phenol formaldehyde or alkylphenol formaldehyde resins and organic solvents or organic solvent mixtures including a preferred 90:10 mixture of toluene and isopropyl alcohol. However, the patent does not disclose or suggest the use of alkylphenols or ethoxylated alkylphenols in such compositions.

U.S. Pat. No. 3,867,247 relates to adhesive contact cements which contain neutralized, partially neutralized or unneutralized sulfonated butyl elastomers, tackifying resins including phenol formaldehyde or alkylphenol formaldehyde resins and organic solvents or organic solvent mixtures including a preferred 90:10 mixture of toluene and isopropyl alcohol. However, the patent does not disclose or suggest the use of alkylphenols or ethoxylated alkylphenols in such compositions.

The adhesive compositions described in the aforementioned patents suffer from a significant disadvantage which materially limits their usefulness as a contact adhesive for bonding cured EPDM elastomer roofing sheets together and that is their deficiency in Quick Stick properties. Also the use of organic solvents in such systems would likely run afoul of environmental regulations, which control the release of volatile organics.

One adhesive system for EPDM elastomers that provides good Quick Stick is described in U.S. Pat. No. 4,480,012, owned by the Assignee of record herein. Such adhesives comprise a neutralized sulfonated EPDM elastomeric terpolymer; an organic hydrocarbon solvent; a para-alkylated phenol formaldehyde tackifying resin and an alkylphenol or ethoxylated alkylphenol. While the use of such adhesive compositions is an effective means of joining and sealing the edges of elastomeric roofing material, if the use of adhesives could be eliminated, the additional labor material costs and related hardware necessary to apply the adhesive would effect a significant cost savings. Moreover, elimination of the need to cure the material prior to its application to a roof would also be advantageous.

Co-pending application U.S. Patent Application Ser. No. 07/594,461 now U.S. Pat. No. 5,162,436 discloses a sheeting material composition which eliminates the need for adhesives, solvents and the need for curing prior to application to the roof. While these advantages effect cost savings and are environmentally prudent, a need exists for providing a roof coveting system which bonds quicker and results in a stronger bond. The high rate of bonding would also ensure that the roofing is water tight, an important requirement for most applications. A seam of variable width and hence strength is also desirable.

SUMMARY OF THE INVENTION

It is an object of the present invention to provide a thermoplastic film which replaces traditional adhesives for seaming together two reinforced or unreinforced, cured or uncured EPDM or EPR roof sheeting materials.

It is another object of the present invention to provide a thermoplastic film for EPDM and EPR roof sheeting materials which eliminates the need for a solvent or non-solvent based splicing adhesive and the related labor and hardware necessary for mixing and application thereof.

It is still another object of the present invention to provide a thermoplastic film for seaming together two EPDM, EPR or other olefin type roof sheeting materials, which do not necessarily require curing and which can be joined and seamed together at their edges without the use of adhesives, either solvent or non-solvent based.

It is a further object of the present invention to provide a thermoplastic film as described above which results in a water tight fit between the roof sheeting materials.

Yet another object of the present invention is to provide a thermoplastic film as described above which eliminates the use of organic solvents in seaming together EPDM or EPR roof sheeting materials.

It is still another object of the present invention to provide a thermoplastic film as described above which can be used to form a seam of variable width and hence varied strength between two layers of EPDM or EPR roof sheeting.

In general the present invention relates to a laminate seam of flat rubber sheet material for roofing comprising two layers of sheet material, at least one layer of which is uncured or cured; and one layer of a thermoplastic film interposed between the edge area of the two layers of sheet material, when the edge areas are overlapped to form a seam without the use of an adhesive.

A method for covering a roof is also provided and comprises the steps of applying a thermoplastic film to the edge area of at least one layer of a flat rubber sheet material; applying a second layer of flat rubber sheet material overlapping the thermoplastic film and the edge of the first flat rubber sheet material; heating the overlapped areas to slightly above the peak melt temperature of the thermoplastic film and seaming the overlapped areas using sufficient heat and pressure to provide an acceptable seam without the use of an adhesive.

The roof sheeting used to practice this invention may also be sulfur curable. Both uncured and cured roofing membranes may optionally be scrim reinforced.

At least one or more of the foregoing objects which shall become apparent to those skilled in the art are described in greater detail with reference to the specification which follows.

BRIEF DESCRIPTION OF THE DRAWING

The drawing FIGURE is a vertical cross-section of two single ply EPDM roofing membranes, joined at the seam area by a thermoplastic film, according to the present invention.

PREFERRED EMBODIMENT OF THE INVENTION

As noted, the sheeting materials used in the present invention comprise EPDM, EPR or other similar olefin type polymers. The term EPDM is used in the sense of its definition as found in ASTM-D-1418-85 and is intended to mean a terpolymer of ethylene, propylene and a diene monomer with the residual unsaturation portion of the diene in the side chain. Illustrative methods for preparing such terpolymers are found in U.S. Pat. No. 3,280,082, the disclosure of which is incorporated herein by reference. The preferred polymers having from about 60 to about 95 weight percent ethylene and from about zero to about 12 weight percent of the diene with the balance of the polymer being propylene or some other similar olefin type polymer.

The diene monomer utilized in forming the EPDM terpolymer is preferably a non-conjugated diene. Illustrative examples of non-conjugated dienes which may be employed are dicyclopentadiene, alkyldicyclopentadiene, 1,4-pentadiene, 1,4-hexadiene, 1,5-hexadiene, 1,4-heptadiene, 2-methyl-1,5-hexadiene, cyclooctadiene, 1,4-octadiene, 1,7-octadiene, 5-ethylidene-2-norbornene, 5-n-propylidene-2-norbornene, 5-(2-methyl-2-butenyl)-2-norbornene and the like. A typical EPDM is Vistalon® MD-744 (Exxon Chemical Co.) a terpolymer having a Mooney Viscosity (ML/4 at 125° C.) of about 52; an ethylene/propylene (E/P) ratio of 61/39 weight percent and 2.7 weight percent of unsaturation.

Particularly useful and preferred in preparing a sulfur curable EPDM composition is Royalene® 3180 (Uniroyal Chemical Co.) which has a Mooney Viscosity (ML/4 at 125° C.) of about 54; an ethylene/propylene ratio of about 67/33 weight percent; about 2.2 weight percent of unsaturation (5-ethylidene-2-norbornene); about 2.7 percent by weight of crystallinity and a weight average molecular weight of approximately 313,000 to 355,000. Vistalon® MD-744 (Exxon Chemical Co.) is another useful sulfur curable EPDM rubber having a Mooney Viscosity (ML/4 at 125° C.) of about 53; an ethylene/propylene (E/P) ratio of about 60/40 weight percent; about 2.7 weight percent of unsaturation (5-ethylidene-2-norbornene) and a weight average of approximately 360,000. Also useful are thermoplastic heat seamable sheeting materials, i.e., EPDM's and EPR's having a high degree of crystallinity as opposed to amorphous (non-crystalline) EPDM's or EPR's. Examples thereof include Royalene® 375 (Uniroyal Chemical Co.); and EPsyn® 5508 and EPsyn® MDE 249 (Copolymer Rubber & Chemical Corporation). Royalene® 375 has a Mooney Viscosity (ML/4 at 125° C.) of about 50.8; an E/P ratio of 75/25 weight percent and about 2.0 weight percent of unsaturation (dicyclopentadiene) and a weight average molecular weight of approximately 190,000. EPsyn® 5508 has a Mooney Viscosity (ML/4 at 125° C.) of about 55.6; an E/P ratio of 73/27 weight percent and about 3.7 weight percent of unsaturation. EPsyn® MDE 249, an experimental terpolymer has a Mooney Viscosity (ML/4 at 125° C.) of about 56; an E/P ratio of 71/29 weight percent and about 1.7 weight percent of unsaturation (5-ethylidene-2-norbornene) can also be employed. A more complete discussion of heat seamable materials, is set forth in our copending application, U.S. Ser. No. 07/594,457, the subject matter of which is incorporated herein by reference.

The term EPR is used in the sense of its definition as found in ASTM D-1418-85 and is intended to mean a copolymer of ethylene and propylene. The preferred copolymers contain from about 30 to 95 weight percent ethylene with the balance to total 100 weight percent being propylene. A typical EPR is Vistalon® 719 (Exxon Chemical Co.) having an E/P ratio of about 75/25 weight percent.

Also, useful as a roofing material in the present invention is a copolymer of ethylene and butene. This particular copolymer has about 82 weight percent ethylene with the balance to total 100 weight percent being butene. A typical ethylene/butene copolymer is GERS-1085 (Union Carbide Corporation) having an $\overline{M}w$, as measured by GPC of at least about 221,000. Other similar olefinic polymers (e.g., ethylene/octene copolymer) can be used to practice this invention. Generally speaking any semi-crystalline polymer having more than about 2 percent by weight crystallinity and selected from the group consisting of polyolefins prepared from monomers containing at least 2 carbon atoms can be employed. For purposes of discussion herein, references to EPDM, EPR or similar olefinic polymers is intended to include any of the semi-crystalline polymers of the present invention.

The composition employed to form the sheeting material comprises 100 parts by weight of EPDM, EPR, or other similar olefinic type polymers, including mixtures of two or more types, to which are added fillers and processing materials as well as optionally other components including curatives, all of which are discussed hereinbelow.

With respect first to the fillers, suitable fillers are selected from the group consisting of reinforcing and non-reinforcing materials, and mixtures thereof, as are customarily added to rubber. Examples include such materials as carbon black, ground coal, calcium carbonate, clay, silica, cryogenically ground rubber and the like. Preferred fillers include carbon black, ground coal and cryogenically ground rubber.

Carbon black is used in an amount of about 20 parts to about 300 parts per 100 parts of polymer (phr), preferably in an amount of about 60 to about 150 phr. The preferred range of carbon black herein (60 to 150 phr) is about equal to the amount of carbon black normally used in preparing sulfur cured EPDM roof sheeting. The carbon black useful herein is any carbon black. Preferred are furnace blacks such as GPF (general purpose furnace), FEF (fast extrusion furnace) and SRF (semi-reinforcing furnace).

The ground coal employed as a filler in the compositions of the invention is a dry, finely divided black powder derived from a low volatile bituminous coal. The ground coal has a particle size ranging from a minimum of 0.26 microns to a maximum of 2.55 microns with the average particle size of 0.69±0.46 as determined on 50 particles, using Transmission Electron Microscopy. The ground coal produces an aqueous slurry having a pH of about 7.0 when tested in accordance with ASTM D-1512. A preferred ground coal of this type is designated Austin Black which has a specific gravity of 1.22±0.03, an ash content of 4.58% and a sulfur content of 0.65%. Austin Black is commercially available from Coal Fillers, Inc., P.O. Box 1063, Bluefield, Va. Amounts range from about 5 to 65 phr with about 15 to 35 being preferred.

Finally, essentially any cryogenically ground rubber may be employed as a filler in the composition of the invention. The preferred cryogenically ground rubbers are cryogenically ground EPDM, butyl, neoprene and the like. A preferred cryogenically ground rubber is a cryogenically ground EPDM rubber. The preferred cryogenically ground EPDM rubber is a fine black rubbery powder having a specific gravity of 1.129±0.015 and a particle size ranging from about 30 to about 300 microns with an average particle size ranging from about 50 to about 80 microns. Amounts range from about 5 to 40 phr with about 10 to 25 phr being preferred.

Mixtures of Austin black and cryogenically ground rubber useful herein may be utilized as a partial replacement for carbon black. Where mixtures of these two fillers are employed the relative amounts thereof can be widely varied; the overall total not exceeding about 60 phr. The ratio of Austin black to cryogenically ground rubber may range from a desired ratio of 2:1 to perhaps even a ratio of 3:1. Again, as noted hereinabove, other filler materials can be employed. Amounts of these filler materials fall within the range of amounts normally employed in preparing sulfur cured conventional roof sheeting.

With respect to the processing material, it is included to improve the processing behavior of the composition (i.e. reduce mixing time and increase rate of sheet forming and includes processing oils, waxes and the like). The processing oil is included in an amount ranging from about 20 parts to about 150 parts process oil per 100 parts EPDM ingredient phr, preferably in an amount ranging from about 60 to about 100 phr. A preferred processing oil is a paraffinic oil, e.g. Sunpar 2280 which is available from the Sun Oil Company. Other petroleum derived oils including naphthenic oils may be used.

Optional ingredients include, for example, other elastomers (e.g., butyl elastomer, neutralized sulfonated EPDM, neutralized sulfonated butyl) in place of minor amounts of the EPDM, secondary inorganic fillers (e.g., talc, mica, clay, silicates, whiting) with total secondary filler content usually ranging from about 10 to about 150 phr, and conventional amounts of other conventional agents, such as zinc oxide, stearic acid, antioxidants, antiozonants, flame retardants, and the like.

Regarding curatives, sulfur is preferred in amounts of about 0.3 to 2 phr. As noted hereinabove, the roof sheeting compound is not cured prior to application and need not be cured subsequent thereto. The presence of sulfur enhances bonding of the Seams.

The compounding ingredients can be admixed, utilizing an internal mixer (such as a Banbury mixer), an extruder, and/or a two-roll mill, or other mixers suitable for forming a viscous relatively uniform admixture. When utilizing a type B Banbury internal mixer, in a preferred mode, the dry or powdery materials such as carbon black are added first followed by the liquid process oil and finally the polymer (this type of mixing can be referred to as an upside-down mixing technique).

The resulting admixture is sheeted to thickness ranging from 5 to 200 mils, preferably from 35 to 60 mils, by conventional sheeting methods, for example, milling, calendering or extrusion. Preferably, the admixture is sheeted to at least 40 gauge (0.040 inches) which is the minimum thickness specified in standards set by the Roofing Council of the Rubber Manufacturers Association for non-reinforced black EPDM rubber sheets for use in roofing applications. In many cases, the admixture is sheeted to 40–45 gauge thickness since this is the thickness for a large percentage of "single-ply" roofing membranes used commercially. The sheeting can be cut to desired length and width dimensions at this time.

The present invention is practiced by utilizing a thermoplastic film between sheets of EPDM or EPR formed from materials as described herein. Once the first sheet is unrolled over the roof substructure in an otherwise conventional fashion, a thermoplastic film is applied to the edge or edges of the first sheet material in the seam area. The next sheet is then applied onto the roof overlapping the thermoplastic film to form a seam. The width of the seam can vary depending on the requirements specified by the architect, building contractor or roofing contractor and thus, does not constitute a limitation of the present invention. Generally, seam widths can vary between about 1 to 6 inches.

With reference to the drawing figure, two layers of roofing membrane sheet material, 10 and 11, are depicted with the edge area 12 of sheet 10 being overlapped by the edge area 13 of sheet 11 to form a seam. Interposed between these overlapped edges, is a layer of thermoplastic film 14 which is employed according to the present invention to form the seam, without the use of adhesives.

The thin thermoplastic film of the present invention may comprise a polyolefin prepared from a monomer or monomers having from 2 to about 8 carbon atoms, such as polyethylene, polypropylene, polybutene, polyoctene and the like, as well as ethylene-vinyl acetate copolymers and blends thereof. Generally, the thickness of the film can range between from about 2 to about 20 mils although greater thicknesses may be employed and thus, are not precluded. For testing purposes, polyethylene films were primarily employed.

Infrared spectrum of these liner films indicated the presence of only ethylene monomer units. Mils of thickness and peak melt temperature (as determine using the Differential Scanning Calorimeter) for each of the thermoplastic materials are provided in Table I.

TABLE I

THERMOPLASTIC FILMS

| Seaming Material | Thickness (mils) | Tm, °C. (by DSC) |
|---|---|---|
| Red PE liner | 3–4 | 108.7[a] |
| Transparent PE liner | 3 | 111.8[a] |
| Embossed PE liner | 4–5 | 109.4[a] |
| Pail liner-opaque[b] | 15–18 | 130.5[a] |
| High MW Polyethylene sheeting | | |
| P150[c] | 6 | 139.4[a] |
| P550[c] | 20 | 140.5[a] |

[a]Peak melt temperature
[b]High density polyethylene
[c]STAMYLAN UH ®

Next, heat and some pressure are applied to the overlapped edges of two roof sheets to form a seam. At the location of the seam, temperature is conveniently applied from about 100° to 550° C. using a Leister hand-held heating gun and some pressure. Generally, the seam area should be heated to slightly above the melt temperature of the thermoplastic film. Pressure can vary widely from a minimum of about 3 psi to as high as 60 psi, typically so long as it is adequate to provide an acceptable, water tight seam. Numerous techniques which utilize heat and some pressure can be used to produce a fully acceptable seam as are known to those skilled in the art.

In order to demonstrate practice of the present invention, seams were formed by bonding together layers of EPDM sheet material and various thermoplastic films. These seams were prepared and subjected to both peel and shear adhesion tests, the results of which are provided in Tables III and IV. The EPDM sheeting compositions employed for the tests are shown in Table II hereinbelow. The compositions exemplified are submitted for the purpose of further illustrating the nature of the present invention and are not to be considered as a limitation on the scope thereof. Parts and percentages are by weight, unless otherwise indicated.

Compound Nos. 1 and 2 are typical EPDM polymers, which are not highly crystalline. Compound No. 3 is a highly crystalline EPDM having greater than 2 percent crystallinity, derived from a high ethylene content, that is, greater than 75 weight percent. We have found such EPDM and EPR polymers to be useful as rooftop sheet material that is self-adhering i.e., no adhesive is required between overlapped layers to form the seam. Of course, the present invention can be employed with such materials as well as more highly crystalline EPDM and EPR polymers which do require the use of an adhesive or thermoplastic films of the present invention. A more complete description of self-adhering rooftop materials is set forth in our copending application, U.S. Ser. No. 07/594,457, the subject matter of which is incorporated herein.

TABLE II

SULFUR CURED AND UNCURED BLACK EPDM SHEETING

| Compound No. | (I) | (II) | (III) |
|---|---|---|---|
| Royalene ® 3180 | 100 | 100 | — |
| EPsyn ® MDE 249 | — | — | 100 |
| HiStr GPF black | 60 | 122 | 125 |
| Hi-White ® R[a] | 60 | — | — |
| Austin Black | — | 15 | — |
| Paraffinic process oil | 65 | 87 | 80 |
| Zinc oxide | 2.5 | 4 | — |
| Stearic acid | 1 | 1 | — |
| Magnesium hydroxide | 30 | — | — |
| Cure Package | 2.90 | 4.20 | — |
| TOTAL | 321.40 | 333.2 | 305 |
| Specific gravity (calc.) | 1.2748 | 1.1322 | 1.1099 |
| Scrim Reinforcement | yes | no | yes |

[a]airfloated soft clay from J. M. Huber Corp.

DETAILED PEEL AND SHEAR ADHESION TEST PROCEDURE

Each of the above rubber compounds was subjected to adhesion testing which necessitated the building of test pads comprising 6×6 inch sheets, some reinforced by a fiber reinforcement scrim, and some unreinforced, according to the following procedure:

1. A number of 6×6-inch rubber sheets approximately 45 mils (0.045-inches) in thickness were prepared using factory calendered membrane sheeting, some reinforced with a scrim fabric and some unreinforced. Some of these membranes were vulcanized with sulfur and some were of the uncured variety.

2. A 6×6 inch sheet of the selected thermoplastic film was inserted between two 6×6 inch sheets of rubber.

3. Most of the rubber film assemblies were formed with a hand-held Leister heating gun at 420° C. and 1.5-5 lbs pressure to the seam itself. Pressure was applied to the seam during the heating process using a standard hand roller such as a 2 inch wide metal roller.

4. If the high MW polyethylene film was used either (P150 or P550), the rubber/thermoplastic film assembly was then pressed using a positive pressure mold for about five minutes at 149° C.

5. A clicker machine with a one-inch wide die was utilized to prepare a number of test specimens for seam peel (Type B, 90° peel) and shear (Type A, 180° peel) adhesion testing.

6. Testing machine: Model 1130 Instron Universal Tester—a testing machine of the constant rate-of-jaw separation type. The machine was equipped with suitable grips capable of clamping the specimens firmly and without slippage throughout the tests.

7. The one-inch wide specimens were tested at the rate (both crosshead and chart speed) of two inches per minute using the adhesion test set forth in ASTM D-413 (machine method). Both peel and shear adhesion strength were determined at room temperature (i.e., 23° C.) as well as occasionally at 70° and 100° C. Specimens were allowed 15 minutes to preheat prior to testing at elevated temperatures.

8. Adhesion strength is defined as:

peel adhesion strength (lbs.inch)=pounds force×sample width;

shear adhesion strength (lbs./square inch)=pounds force×sample width.

A number of test specimens were prepared for testing using the 5 gallon pail liner. First, a 9 to 10 mil film of the liner was prepared by heating the pail liner between Mylar film in a positive pressure mold. The resulting 10 mil film was inserted between two layers of rubber and pressed in a 6×6 inch positive pressure mold for about 5 minutes at 149° C. The pail liner has a peak melt temperature of about 129° C. to 130° C.

Rubber test pads were prepared in a positive pressure mold using about 138.8 lbs/in$^2$ and about 13.9 lbs/in$^2$ on the 6×6 inch rubber test pad. All Instron testing was conducted using a crosshead and chart speed of 2 ipm. All one inch wide test specimens were preheated for 15 minutes when tested at an elevated temperature.

Table III below shows a comparison of peel adhesion properties of roof covering obtained using the thermoplastic films of Table I in conjunction with the sheeting of Table II and roof covering obtained using a regular adhesive (Example No. 1) and the sheeting of Table II. Roof sheeting formed from the compositions shown in Table II may optionally be scrim reinforced. Table IV shows a comparison of peel adhesion properties at elevated temperatures. Table V shows the same comparison for shear adhesion properties.

In the examples illustrated in Tables III, IV and V, the control adhesive used was the commercially available lap splice adhesive Uniroyal SA-1065, a butyl based lap splice adhesive for EPDM roof sheet materials. The composition of the EPDM sheetings used in Table III is provided in Table II.

TABLE III

ROOM TEMPERATURE PEEL ADHESION COMPARISON

| Ex. No. | Type of Adhesive/Film | Properties Measured | Adhesion Results/Seam Failures | | |
|---|---|---|---|---|---|
| 1 | Adhesive Seamed Control[a] | Peel Adhesion, lbs/inch | 1–7 | | |
|   |   | Seam Failure | Adhesive Failure | | |
|   |   |   | Type of Sheeting | | |
|   |   |   | EPDM (I) Sulfur Cured Scrim Reinforced | EPDM (II) Sulfur Cured Unreinforced | EPDM (III) Uncured Scrim Reinforced |
| 2 | Red PE liner | Peel Adhesion, lbs/inch | 0.6–1.6 | 3–5.4 | 0.8 |
|   |   | Seam Failure | (A) | (A), (B) | (A) |
| 3 | Transparent PE liner | Peel Adhesion, lbs/inch | 0.6–2.2 | 2.8–7 | 2.2–4 |
|   |   | Seam Failure | (A) | (A), (B) | (A) |
| 4 | Embossed PE liner | Peel Adhesion, lbs/inch | 1–2 | 3–4 | 0.8–1 |
|   |   | Seam Failure | (A) | (A), (B) | (A) |
| 5 | 5 gal. pail liner (HDPE) | Peel Adhesion, lbs/inch | 2.3 | >14.3 | >15.6 |
|   |   | Seam Failure | (A) | (C) | (C) |
| 6 | High MW PE film |   |   |   |   |
|   | (a) P150 (6 mils) | Peel Adhesion, lbs/inch | 2.5[b] | >21.5[b] | >46.5[b] |
|   |   | Seam Failure | (A) | (C) | (C) |
|   | (b) P550 (20 mils) | Peel Adhesion, lbs/inch | 4–4.5[b] | >22[b] | >33[b] |
|   |   | Seam Failure | (A) | (C) | (C) |

(A) = Failure occurred between thermoplastic film and rubber membrane
(B) = Tearing into the thermoplastic film itself

TABLE III-continued

ROOM TEMPERATURE PEEL ADHESION COMPARISON

| Ex. No. | Type of Adhesive/Film | Properties Measured | Adhesion Results/Seam Failures |
|---|---|---|---|
| 1 | Adhesive Seamed Control[a] | Peel Adhesion, lbs/inch Seam Failure | 1–7<br>Adhesive Failure |

(C) = Test specimen broke in Instron clamp or rubber tore to fabric reinforcement during testing
[a]Unreinforced, sulfur cured conventional black EPDM membrane seamed with SA-1065 lap splice adhesive
[b]Pressure during molding 138.8 psi

TABLE IV

ELEVATED TEMPERATURE PEEL ADHESION COMPARISON

| Ex. No. | Type of Adhesive/Film | Properties Measured | Adhesion Results/Seam Failures | | |
|---|---|---|---|---|---|
| 1 | Adhesive Seamed Control[a] | Peel Adhesion @ 23° C., lbs/inch Seam Failure | 1–7<br>Adhesive Failure | | |
| 7 | Adhesive Seamed Control[a] | Peel Adhesion @ 70° C., lbs/inch Seam Failure | 1.2<br>Adhesive Failure | | |
| 8 | Adhesive Seamed Control[a] | Peel Adhesion @ 100° C., lbs/inch Seam Failure | 0.85<br>Adhesive Failure | | |
| | | | Type of Sheeting | | |
| | | | Reinforced Sulfur Cured EPDM (I) | Unreinforced Sulfur Cured EPDM (II) | Reinforced Uncured EPDM (III) |
| 9 | 5 gal. pail liner (HDPE) | Peel Adhesion at 23° C., lbs/inch<br>Seam Failure | —<br>— | >23.5[c]<br>(C) | >34[c]<br>(C) |
| 10 | 5 gal. pail liner (HDPE) | Peel Adhesion @ 70° C. lbs/inch<br>Seam Failure | —<br>— | >20[c]<br>(C) | >2.1[c]<br>(C) |
| 11 | 5 gal. pail liner (HDPE) | Peel Adhesion @ 100° C. lbs/inch<br>Seam Failure | —<br>— | >14.4[c]<br>(C) | >1.7[c]<br>(C) |
| 12 | High MW PE Film | | | | |
| | (a) P150 (6 mils) | Peel Adhesion @ 70° C., lbs/inch<br>Seam Failure | 1<br>(A) | >12.5[b]<br>(C) | >2.2[b]<br>(C) |
| | (b) P550 (20 mils) | Peel Adhesion @ 70° C., lbs/inch<br>Seam Failure | 2.5–3<br>(A) | >14[b]<br>(C) | >2.65[b]<br>(C) |

(A) = Failure occurred between thermoplastic film and rubber membrane
(B) = Tearing into the thermoplastic film itself
(C) = Test specimen broke in Instron clamp or rubber tore to fabric reinforcement during testing
[a]Unreinforced sulfur cured conventional black EPDM membrane seamed with SA-1065 lap splice adhesive
[b]Pressure during molding 138.8 psi
[c]Pressure during molding 13.9 psi

TABLE V

SHEAR STRENGTH COMPARISON

| Ex. No. | Type of Adhesive/Film | Properties Measured | Adhesion Results/Seam Failures | | |
|---|---|---|---|---|---|
| 13 | Adhesive Seamed Control[a] | Seam Shear Strength @ 23° C. lbs/inch²<br>Seam Failure | 27<br>Adhesive Failure | | |
| 14 | Adhesive Seamed Control[a] | Seam Shear Strength @ 70° C. lbs/inch²<br>Seam Failure | 11.5<br>Adhesive Failure | | |
| | | | Type of Sheeting | | |
| | | | Reinforced Sulfur Cured EPDM (I) | Unreinforced Sulfur Cured EPDM (II) | Reinforced Uncured EPDM (III) |
| 15 | 5 gal. pail liner | Seam Shear Strength @ 23° C., | — | >27.5 | |

TABLE V-continued

SHEAR STRENGTH COMPARISON

| Ex. No. | Type of Adhesive/Film | Properties Measured | Adhesion Results/Seam Failures |
|---|---|---|---|
| 13 | Adhesive Seamed Control[a] | Seam Shear Strength @ 23° C. lbs/inch² | 27 |
|  |  | Seam Failure | Adhesive Failure |
| 14 | Adhesive Seamed Control[a] | Seam Shear Strength @ 70° C. lbs/inch² | 11.5 |
|  |  | Seam Failure | Adhesive Failure |
|  |  | lbs/inch² |  |
|  |  | Seam Failure | — (C) — |
| 16 | 5 gal. pail liner | Seam Shear Strength @ 70° C., lbs/inch² | — >21.5 — |
|  |  | Seam Failure | — (C) — |

(C) = Test specimen broke in Instron clamp or rubber tore to fabric reinforcement during testing
[a]Unreinforced sulfur cured conventional black EPDM membrane seamed with SA-1065 lap splice adhesive Peel adhesion as shown in Table III for the adhesive seamed conventional black EPDM membrane (control) at 23° C. was 1–7 lbs/inch, while seam shear adhesion at 23° C. in Table V was 27 lbs/square inch. The control adhesion test samples were prepared using an unreinforced sulfur cured conventional black EPDM membrane seamed with SA-1065, a lap splice adhesive commercially available from Uniroyal Chemical. A substantial increase in both peel and shear adhesion resulted using either the unreinforced, sulfur cured EPDM (II) sheeting or the reinforced, uncured EPDM (III) sheet seamed with the HDPE (pail liner) or the ultra high MW polyethylene (P150/P550) relative to the adhesive seamed control. Both the sulfur cured and uncured black EPDM (I–III) sheets were seamed with the polyethylene liners and gave comparable and/or directionally improved seam peel adhesion results. These adhesion results demonstrate that the use of polyethylene films such as those comprising polyethylene and using sufficient heat and some pressure allows the formation of acceptable seams without using adhesives. None of the experimental seams were wash or scrubbed with gasoline or organic solvents during seam preparation.

In conclusion, it should be clear from the foregoing examples and specification disclosure that the use of a thermoplastic film in conjunction with flat sheets featuring sulfur cured or uncured EPDM, EPR or other olefin type polymers allows such sheet material to be seamed along the overlapped edges, using sufficient heat and some pressure, without the use of adhesives. Moreover, the sheet materials may not require that a dusting or release agent be applied to the surface of the membrane followed by autoclave curing. Also, roof sheeting material formed from the formulations shown in Table II may optionally be scrim reinforced. It is to be understood that the invention is not limited to the specific types of thermoplastic films or EPDM exemplified herein or by the disclosure of other typical EPDM, EPR or other olefin type polymers provided herein, the examples having been provided merely to demonstrate the practice of the subject invention. Those skilled in the art may readily select other thermoplastic films, or other EPDM, EPR or other similar olefin polymers including copolymers of ethylene and butene and ethylene and octene, according to the disclosure made hereinabove. Similarly, the invention is not necessarily limited to the particular fillers and processing material exemplified or the amounts thereof.

Thus, it is believed that any of the variables disclosed herein can readily be determined and controlled without departing from the scope of the invention herein disclosed and described. Moreover, the scope of the invention shall include all modifications and variations that fall within the scope of the attached claims.

What is claimed is:

1. A method for covering roofs comprising the steps of:

applying a thermoplastic film to the edge area of at least one layer of a flat rubber sheet material, said sheet material consisting essentially of a polymeric composition of matter consisting essentially of a semi-crystalline polyolefin rubber having more than about 2 percent by weight crystallinity and an ethylene content in excess of 60 percent, selected from the group consisting of ethylene-propylene copolymers and terpolymers; from about 20 to 300 parts by weight of a filler selected from the group consisting of reinforcing and non-reinforcing materials and mixtures thereof, per 100 parts of said polymer; and from about 20 to 150 parts by weight of a processing material and mixtures thereof, per 100 parts of said polymer;

applying a second layer of said flat rubber sheet material overlapping said thermoplastic film and the edge area of said first layer of flat rubber sheet material, at least one of said first and second layers of flat rubber sheet material being uncured;

heating the overlapped areas to slightly above the peak melt temperature of the thermoplastic film, said uncured layer of flat rubber sheet material remaining uncured after heating; and seaming the overlapped area under sufficient heat and pressure for less than about 5 minutes to provide a seam, said sheet material exhibiting a seam peel adhesion value of at least 2 pounds/inch and a shear adhesion value of at least about 15 pounds/square inch, in the absence of a pressure sensitive adhesive.

2. A method, as set forth in claim 1, wherein said step of heating is conducted under a temperature of at least about 100° C.

3. A method, as set forth in claim 1, wherein said thermoplastic film is selected from the group consisting of polyolefins prepared from monomers having from 2 to about 8 carbon atoms, ethylene-vinyl acetate copolymers and blends thereof.

4. A method, as set forth in claim 1, wherein said filler comprises about 110 parts by weight of carbon black and said composition of matter includes about 70 parts by weight of processing oil.

5. A method, as set forth in claim 1, wherein said flat rubber sheet material is scrim-reinforced.

6. A method, as set forth in claim 1, wherein said flat rubber sheet material is unreinforced.

7. A method, as set forth in claim 1, including the step of selecting a thermoplastic film having a thickness of at least 2 mils.

8. A method for covering roofs comprising the steps of:

applying a thermoplastic film to the edge area of at least one layer of a flat rubber sheet material, said sheet material consisting essentially of a polymeric composition of matter consisting essentially of a semi-crystalline polyolefin rubber having more than about 2 percent by weight crystallinity and an ethylene content in excess of 60 percent, selected from the group consisting of ethylene-propylene copolymers and terpolymers; from about 20 to 300 parts by weight of a filler selected from the group consisting of reinforcing and non-reinforcing materials and mixtures thereof, per 100parts of said polymer; and from about 20 to 150 parts by weight of a processing material and mixtures thereof, per 100 parts of said polymer;

applying a second layer of said flat rubber sheet material overlapping said thermoplastic film and the edge area of said first layer of flat rubber sheet material, at least one of said first and second layers of flat rubber sheet material being uncured;

heating the overlapped areas to slightly above the peak melt temperature of the thermoplastic film, said uncured layer of flat rubber sheet material remaining uncured after heating; and seaming the overlapped area under sufficient heat and pressure for less than about 5 minutes to provide a seam, said sheet material exhibiting a seam peel adhesion value of at least 2 pounds/inch and a shear adhesion value of at least about 15 pounds/square inch, in the absence of any solvent-activated adhesive.

9. A method for covering roofs comprising the steps of:

applying a thermoplastic film to the edge area of at least one layer of a flat rubber sheet material, said sheet material consisting essentially of a polymeric composition of matter consisting essentially of a semi-crystalline polyolefin rubber having more than about 2 percent by weight crystallinity and an ethylene content in excess of 60 percent, selected from the group consisting of ethylene-propylene copolymers and terpolymers; from about 20 to 300 parts by weight of a filler selected from the group consisting of reinforcing and non-reinforcing materials and mixtures thereof, per 100 parts of said polymer; and from about 20 to 150 parts by weight of a processing material and mixtures thereof, per 100 parts of said polymer;

applying a second layer of said flat rubber sheet material overlapping said thermoplastic film and the edge area of said first layer of flat rubber sheet material, at least one of said first and second layers of flat rubber sheet material being uncured;

heating the overlapped areas to slightly above the peak melt temperature of the thermoplastic film, said uncured layer of flat rubber sheet material remaining uncured after heating; and seaming the overlapped area under sufficient heat and pressure for less than about 5 minutes to provide a seam, said sheet material exhibiting a seam peel adhesion value of at least 2 pounds/inch and a shear adhesion value of at least about 15 pounds/square inch, in the absence of any adhesive having tack prior to the application of heat.

* * * * *